United States Patent [19]

Higurashi

[11] Patent Number: 4,819,088
[45] Date of Patent: Apr. 4, 1989

[54] MAGNETIC RECORDING AND REPRODUCING SYSTEM

[75] Inventor: Seiji Higurashi, Chiba, Japan

[73] Assignee: Victor Company of Japan, Ltd., Yokohama, Japan

[21] Appl. No.: 27,633

[22] Filed: Mar. 18, 1987

[30] Foreign Application Priority Data

Mar. 19, 1986 [JP] Japan .................................. 51-61773

[51] Int. Cl.$^4$ ............................................. G11B 20/10
[52] U.S. Cl. ..................................... 360/19.1; 360/32; 358/343; 369/59
[58] Field of Search ........................ 358/341, 343, 140; 369/59; 360/9.1, 19.1, 32, 37.1

[56] References Cited

U.S. PATENT DOCUMENTS

| | | | |
|---|---|---|---|
| 4,283,736 | 8/1981 | Moris | 358/140 |
| 4,346,397 | 8/1982 | Ota | 338/140 |
| 4,587,557 | 5/1986 | Dorrnhein | 358/140 |
| 4,646,171 | 2/1987 | Odaka | 360/32 |
| 4,660,103 | 4/1987 | Wilkinson | 358/343 |
| 4,660,104 | 4/1987 | Higuroshi | 358/343 |
| 4,672,442 | 6/1987 | Yamaguchi | 358/140 |

*Primary Examiner*—Aristotelis M. Psitos
*Attorney, Agent, or Firm*—Michael N. Meller

[57] ABSTRACT

A magnetic recording and reproducing system encodes a digitized audio signal into first and second blocks which are constituted by sample of the audio signal within one field or one frame of a video signal in a sequence dependent on a field frequency of the video signal so that the encoding is completed in each block and all of the samples of the audio signal within one field or one frame are encoded in a predetermined number of the first and second blocks. The first block is constituted by a number of samples greater than a number of samples constituting the second block. The digital audio signal is recorded on and reproduced from a magnetic tape together with the video signal, and all of the samples of the audio signal within one field or one frame are obtained to reproduce the original analog audio signal by decoding each block with reference to the identification signal.

14 Claims, 11 Drawing Sheets

FIG. 4

| | 0 | 1 | 2 | ... | 22 | 23 | 24 | ... | 28 | 29 | 30 | ... | 48 | 49 | 50 | 51 | 52 | 53 | ... | 57 |
|---|---|---|---|---|---|---|---|---|---|---|---|---|---|---|---|---|---|---|---|---|
| 0 | L0u | L1u | L2u | --- | L22u | Q0 | Q1 | --- | Q5 | L23u | L24u | --- | L44u | L45u | | | Q0 | Q1 | --- | Q5 |
| 1 | L0l | L1l | L2l | --- | L22l | Q0 | Q1 | --- | Q5 | L23l | L24l | --- | L44l | L45l | | | Q0 | Q1 | --- | Q5 |
| 2 | R0u | | | | R22u | Q0 | Q1 | --- | Q5 | R23u | | | | R45u | | | Q0 | Q1 | --- | Q5 |
|   | R0l | | | | R22l | Q0 | Q1 | --- | Q5 | R23l | | | | R45l | | | Q0 | Q1 | --- | Q5 |
| L46u–L46l | | | | | | | | | | | | | | | | | | | | |
| L92u | | | DATA f | | | | Qf | | | | DATAb | | | | | | | Qb | | |
| L138u | | | | | | | | | | | | | | | | | | | | |
| L184u | | | | | | | | | | | | | | | | | | | | |
| L230u | | | | | L298u | | | | | L299u | | | | | | | | | | |
| L276u | | | | | | | | | | | | | L318u L319u L320u L321u | | | | | | | |
| | | | | | | | | | | | | | L318l L319l L320l L321l | | | | | | | |
| | | | | | | | | | | | | | R318u R319u R320u R321u | | | | | | | |
| | | | | | | | | | | | | | R318l R319l R320l R321l | | | | | | | |
| 27 | | | | | | | | | | | | | | | | | | | | |
| 28 P0 | | P | | | | | P | | | | P | | | | | | P | | | |
| 29 P1 | | | | | | | | | | | | | | | | | | | | |
| 30 P2 | | | | | | | | | | | | | | | | | | | | |
| 31 P3 | | | | | | | | | | | | | | | | | | | | |

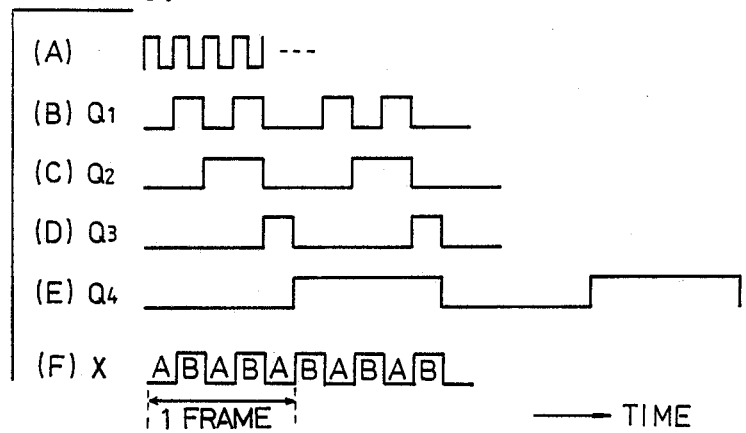
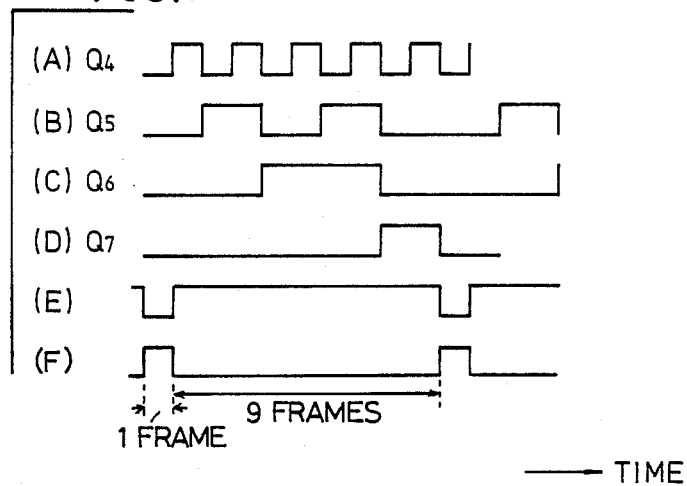

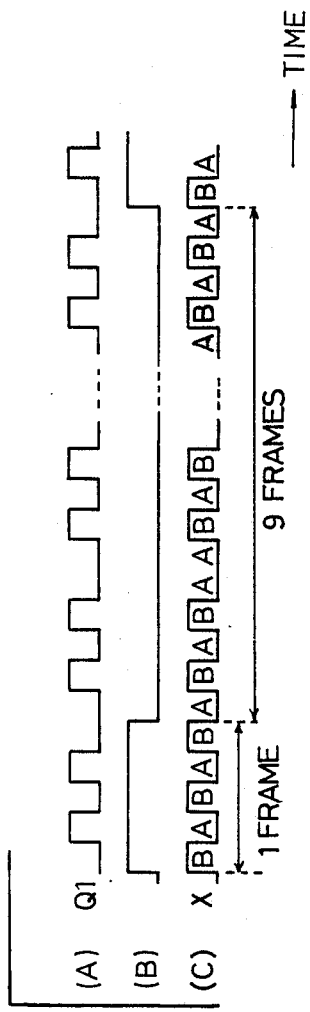

MAGNETIC RECORDING AND REPRODUCING SYSTEM

BACKGROUND OF THE INVENTION

The present invention generally relates to magnetic recording and reproducing systems, and more particularly to a magnetic recording and reproducing system for recording and reproducing a video signal and a digital audio signal on and from a magnetic tape.

Conventionally, there are systems for recording and reproducing a frequency modulated (FM) audio signal on and from a deep layer portion of a magnetic layer on a magnetic tape by use of rotary audio heads and recording and reproducing a video signal on and from a surface layer portion of the magnetic layer on the magnetic tape by use of rotary video heads. According to such systems, since the FM audio signal is an analog signal, the quality of the audio signal becomes deteriorated every time a dub-recording is carried out on the FM audio signal.

For these reasons, in the so-called 8-mm video tape recorders or cameras, a digital audio signal is recorded in a portion of a track which is recorded by the rotary video head. The deterioration in the quality of the audio signal introduced by the dub-recording is extremely small because the audio signal is recorded and reproduced in the form of a digital signal.

In the 8-mm video tape recorder, the analog audio signal is digitized for every one field of the video signal. However, the field frequency depends on the television system. In other words, the field frequency is 60 Hz in the case of a monochrome video signal of M-system, the field frequency is 59.94 Hz in the case of the NTSC system color video signal, and the field frequency is 50 Hz in the case of the PAL system color video signal or the like.

For this reason, there is a problem in that synchronism of the video signal and the digital audio signal cannot be obtained between a first apparatus for recording and reproducing the video signal having the field frequency of 50 Hz and a second apparatus for recording and reproducing the video signal having the field frequency of 59.94 Hz or 60 Hz. In order to obtain synchronism of the video signal and the digital audio signal, the sampling frequency of the analog audio signal must be changed between the first and second apparatuses, or the encoding algorithm must be greatly modified between the first and second apparatuses.

SUMMARY OF THE INVENTION

Accordingly, it is a general object of the present invention to provide a novel and useful magnetic recording and reproducing system in which the problems described heretofore are eliminated.

Another and more specific object of the present invention is to provide a magnetic recording and reproducing system which encodes a digitized audio signal into first and second blocks which are constituted by samples of the audio signal within one field or one frame of a video signal in a sequence dependent on a field frequency of the video signal so that the encoding is completed in each block and all of the samples of the audio signal within one field or one frame of the video signal are encoded in a predetermined number of the first and second blocks to form a digital audio signal by adding an identification signal for identifying the first and second blocks, where the first block is constituted by a number of samples greater than a number of samples constituting the second block. The digital audio signal is recorded on and reproduced from a magnetic tape together with the video signal. At the time of the reproduction, all of the samples of the audio signal within one field or one frame of the video signal are obtained to reproduce the original analog audio signal by decoding each block with reference to the identification signal. According to the system of the present invention, the sequence of the first and second blocks is determined by the field frequency of the video signal, and for this reason, there is no need to change the sampling frequency nor greatly modify the encoding algorithm depending on the field frequency of the video signal.

Other objects and further features of the present invention will be apparent from the following detailed description when read in conjunction with the accompanying drawings.

BRIEF DESCRIPTION OF THE DRAWINGS

FIG. 4 is a diagram for explaining the generation of codes;

FIGS. 11(A) through 11(F), FIGS. 12(A) through 12(F), and FIGS. 13(A) through 13(C) are timing charts for explaining the operation of the circuit system shown in FIG. 10.

DETAILED DESCRIPTION

Figure 1:
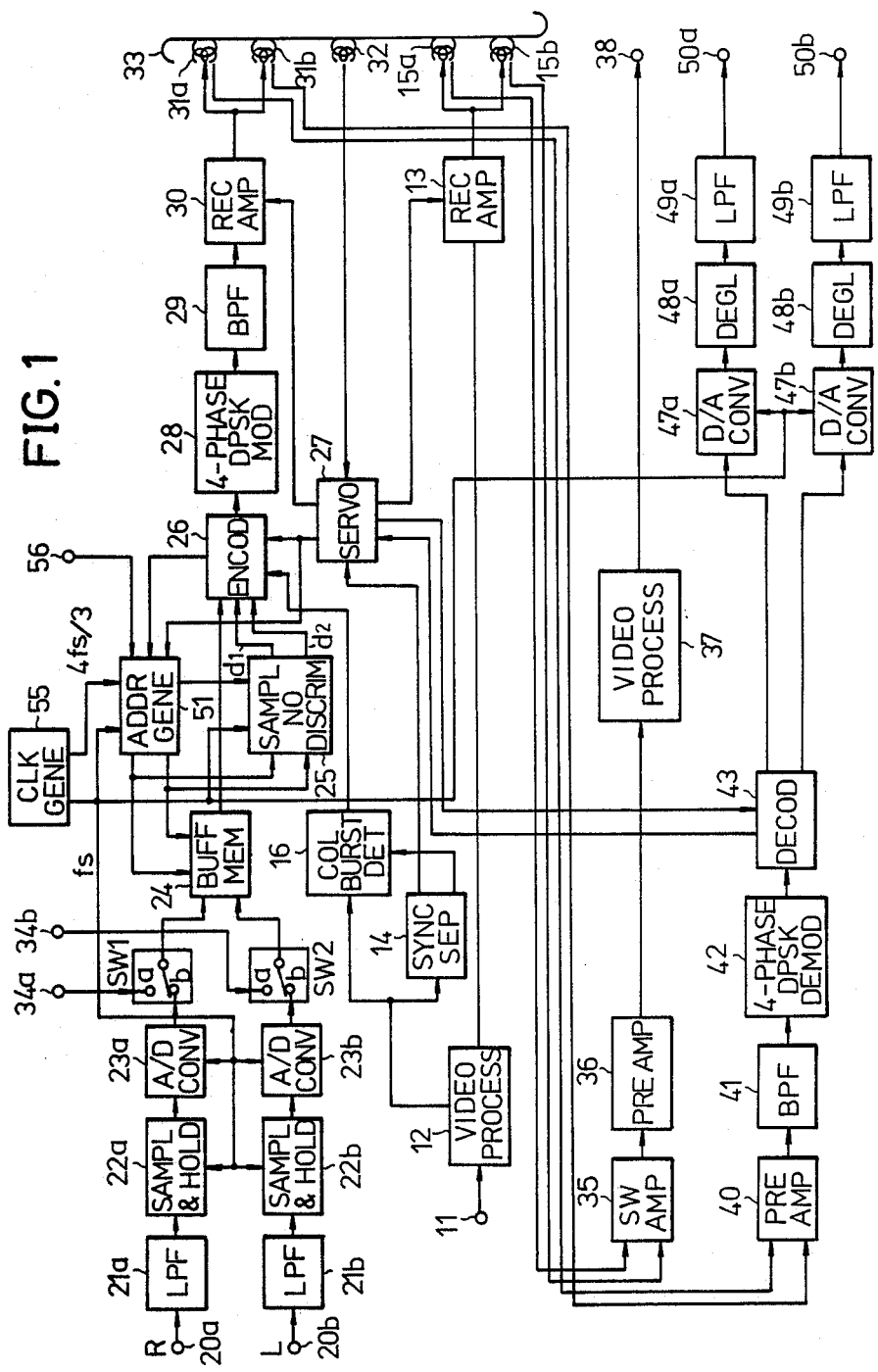
FIG. 1 is a system block diagram showing an embodiment of the magnetic recording and reproducing system according to the present invention.
Figure 2:
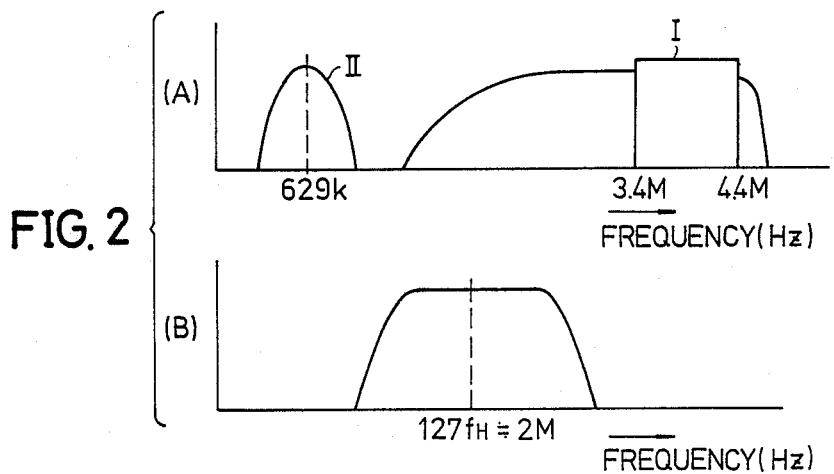
FIGS. 2(A) and 2(B) respectively show frequency spectrums of embodiments of signals which are recorded on and reproduced from a magnetic tape.

FIG. 1 shows an embodiment of the magnetic recording and reproducing system according to the present invention. In FIG. 1, a monochrome video signal having a field frequency of 60 Hz, an NTSC system color video signal having a field frequency of 59.94 Hz, or a PAL system color video signal or the like having a field frequency of 50 Hz is applied to an input terminal 11 as an input video signal. The input video signal is supplied to a video signal processing circuit 12 which is known. By known means, the video signal processing circuit 12 separates the input video signal into a luminance signal and a carrier chrominance signal, frequency-modulates the luminance signal, frequency-converts the carrier chrominance signal into a frequency band lower than a frequency band of the frequency modulated (FM) luminance signal, and produces a frequency division multiplexed signal having a frequency spectrum shown in FIG. 2(A) by frequency-division-multiplexing the FM luminance signal and the frequency converted carrier chrominance signal. In FIG. 2(A), the FM luminance signal has a frequency spectrum I in which the carrier frequency band is 3.4 MHz to 4.4 MHz, and the frequency converted carrier chrominance signal has a frequency spectrum II in which the center frequency is approximately 629 kHz.

The video signal which is to be recorded, that is, the frequency division multiplexed signal, is passed through a recording amplifier 13 and is supplied to rotary video heads 15a and 15b. In addition, the frequency division multiplexed signal from the video signal processing circuit 12 is also supplied to a synchronizing signal separating circuit 14 and to a color burst detecting circuit 16. The synchronizing signal separating circuit 14 separates horizontal and vertical synchronizing signals from the frequency division multiplexed signal, supplies the horizontal synchronizing signal to the color burst detecting circuit 16, and supplies the vertical synchronizing signal to a servo circuit 27 which will be described later. The color burst detecting circuit 16 detects a color burst signal from the frequency division multiplexed signal with a timing dependent on the horizontal synchronizing signal, and produces a detection signal having a level dependent on the existence of the color burst signal. The detection signal from the color burst detecting circuit 16 is supplied to an encoder 26 which will be described later.

Right and left channel analog audio signals are respectively applied to input terminals 20a and 20b. The right channel analog audio signal is passed through a lowpass filter 21a to eliminate an unwanted high frequency component exceeding an audio frequency band. An output audio signal of the lowpass filter 21a is supplied to a sample and hold circuit 22a which carries out a sample and hold operation at a sampling frequency fs of 48 kHz, for example, responsive to a clock pulse fs from a clock generator 55. An output signal of the sample and hold circuit 22a is converted into a digitized audio signal in an analog-to-digital (A/D) converter 23a responsive to the clock pulse fs from the clock generator 55 so that one sample is described in 16 bits. The left channel audio signal is subjected to a similar processing by being passed through a lowpass filter 21b, a sample and hold circuit 22b and an A/D converter 23b.

The digitized right and left channel audio signals from the A/D converters 23a and 23b are passed through respective switches SW1 and SW2 and are supplied to and stored in a buffer memory 24. In a case where a digital dub-recording is to be carried out, digitized right and left channel audio signals which are to be recorded by the digital dub-recording are applied to respective input terminals 34a and 34b, and these signals are supplied to and stored in the buffer memory 24 via the respective switches SW1 and SW2. In other words, the switches SW1 and SW2 are connected to contacts a in a digital dub-recording mode, and are connected to contacts b in a normal recording mode.

Write-in and read-out addresses generated from an address generator 51 are supplied to the buffer memory 24, and the samples of the right and left channels audio signals are written into the buffer memory 24 in accordance with the write-in address. Similarly, the samples of the right and left channel audio signals are read out from the buffer memory 24 in accordance with the read-out address, and are supplied to the encoder 26. The address generator 51 is supplied with the clock pulses fs and 4fs/3 from the clock generator 55, an external data clock from a terminal 56, a timing signal (or an enable signal) from the encoder 26, and the vertical synchronizing signal from the synchronizing signal separating circuit 14 via the servo circuit 27.

Figure 3:
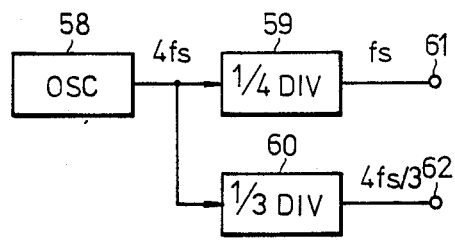
FIG. 3 is a system block diagram showing an embodiment of a clock generator within the block system shown in FIG. 1.

FIG. 3 shows an embodiment of the clock generator 55. The clock generator 55 comprises an oscillator 58 for producing a signal having a frequency of 4fs, a ¼ frequency divider 59 for frequency-dividing the output signal of the oscillator 58 by ¼, and a ⅓ frequency divider 60 for frequency-dividing the output signal of the oscillator 58 by ⅓. The clock pulse fs is outputted via a terminal 61, and the clock pulse 4fs/3 is outputted via a terminal 62.

The encoder 26 is supplied with the vertical synchronizing signal from the synchronizing signal separating circuit 14 via the servo circuit 27 and the detection signal from the color burst detecting circuit 16. Accordingly, in the encoder 26, it is possible to discriminate from the vertical synchronizing signal and the level of the detection signal whether the input video signal is the monochrome video signal having the field frequency of 60 Hz or the NTSC signal color video signal having the field frequency of 59.94 Hz. In other words, when the frequency of the vertical synchronizing signal is approximately 60 Hz, it is possible to discriminate from the level of the detection signal whether the input video signal is the monochrome video signal having the field frequency of 60 Hz or the NTSC system color video signal having the field frequency of 59.94 Hz. The encoder 26 produces the timing signal from the vertical synchronizing signal and controls the read-out timing of the address generator 51 by supplying this timing signal to the address generator 51.

In a case where the audio signal which accompanies the monochrome video signal having the field frequency of 60 Hz is sampled at the sampling frequency of 48 kHz so that one sample is described in 16 bits, there are 1600 (=48000/30) samples of the right (or left) channel audio signal in one frame of the video signal. When this 1600 samples are divided into five equal sample groups, each sample group is constituted by 320 samples. With respect to these 320 samples, the system of the present invention provides a first block A which forms a code in 322 samples and a second block B which forms a code in 318 samples, and all of the samples are transmitted in a combination of these first and second blocks A and B.

Description will now be given with respect to the formation of the codes by referring to FIG. 4. In FIG. 4, the samples of the right channel audio signal are denoted by R, and the samples of the left channel audio signal are denoted by L. The sample numbers are indicated as 0, 1, ..., 321. Out of the 16 bits constituting one sample, the upper 8 bits are denoted by u and the lower 8 bits are denoted by l. One symbol is constituted by the 8 bits (u or l). The upper 8 bits L0u, ..., L45u of the sample numbers 0, ..., 45 of the left channel are arranged in the row number 0. The lower 8 bits L0l, ... L45l of the sample numbers 0, ..., 45 of the left channel are arranged in the row number 1. The upper 8 bits R0u, ..., R45u of the sample numbers 0, ..., 45 of the right channel are arranged in the row number 2. The lower 8 bits R0l, ..., R45l of the sample numbers 0, ..., 45 of the right channel are arranged in the row number 3.

In the case of the block A, a total of 644 samples (=1288 symbols) constituted by 322 samples of the right channel and 322 samples of the left channel are arranged in the column numbers 0 to 22 and 29 to 51 of the row numbers 0 to 27. On the other hand, in the case of the block B, a total of 636 samples (=1272 symbols) constituted by 318 samples of the right channel and 318 samples of the left channel are arranged in the column numbers 0 to 22 and 29 to 51 of the row numbers 0 to 23 and in the column numbers 0 to 22 and 29 to 47 of the row numbers 24 to 27. In the block B, all of the bits are "1" at the positions where the samples L318u through R321l are to be arranged in the column numbers 48 to 51 of the row numbers 24 to 27. The samples in the column numbers 0 to 22 will be denoted by DATAf, and the samples in the column numbers 29 to 51 will be denoted by DATAb. With respect to the above described samples, parities are generated according to the Reed Solomon Code scheme and are added thereto.

Parities Qf in the column numbers 23 to 28 and parities Qb in the column numbers 52 to 57 are respectively generated by known means with respect to the 23 symbols in the column numbers 0 to 22 and the 23 symbols in the column numbers 29 to 51, by use of the following generating polynomial Gq(x) of equation (1).

$$Gq(x)=(x+\alpha^0)\cdot(x+\alpha)\cdot(x+\alpha^2)\cdot(x+\alpha^3)\cdot(x+\alpha^4)\cdot(x+\alpha^5) \quad (1)$$

A parity P is generated by known means with respect to the 28 symbols in each of the columns of the row numbers 0 to 27, by use of the following generating polynomial Gp(x) of equation (2).

$$Gq(x)=(x+\alpha^0)\cdot(x+\alpha)\cdot(x+\alpha^2)\cdot(x+\alpha^3) \quad (2)$$

Figure 5A:
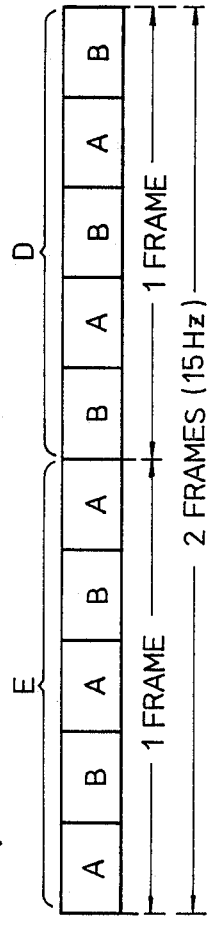
FIGS. 5A through 5C respectively are diagrams for explaining the block generating sequence.

In the case where the video signal has the field frequency of 60 Hz, the encoder 26 encodes the samples of the audio signal within one frame of the video signal in five blocks as shown in FIG. 5A. In two successive frames, the first frame is encoded in blocks A, B, A, B and A in this sequence, and the second frame is encoded in blocks B, A, B, A and B in this sequence. In the first frame, there are 1602 samples per channel (right or left channel), and the sequence of the blocks A, B, A, B and A will hereinafter be referred to as an E(Excess)-block frame. In the second frame, there are 1598 samples per channel, and the sequence of the blocks B, A, B, A and B will hereinafter be referred to as a D(Diminished)-block frame. Hence, in the case of the video signal having the field frequency of 60 Hz, the audio signal is transmitted by an alternate repetition of the E-block frame and the D-block frame. As a result, 48000 (=(1602+1598)×15) samples per channel are encoded in one second.

Figure 5B:
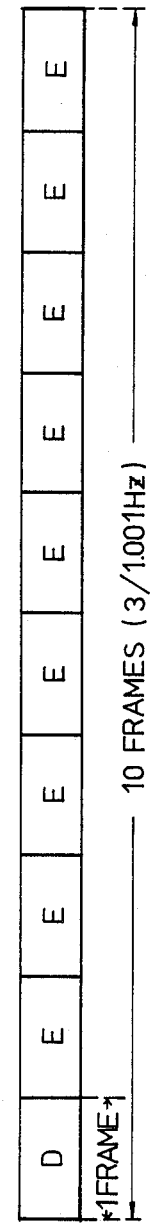

In the case where the video signal has the field frequency of 59.94 Hz, the encoder 26 also encodes the samples of the audio signal within one frame of the video signal in five blocks. In ten successive frames, the first frame is encoded as the D-block frame, and the remaining second through tenth frames are encoded as the E-block frame, as shown in FIG. 5B. Thus, 48000 (=(1598+1602×9)×3/1.001) samples per channel are encoded in one second.

Figure 5C:
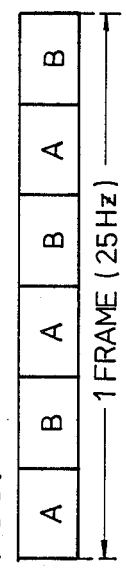

Furthermore, in the case where the video signal has the field frequency of 50 Hz, the encoder 26 encodes the samples of the audio signal within one frame of the video signal in six blocks as shown in FIG. 5C. In each frame, the frame is encoded in blocks A, B, A, B, A and B in this sequence. Thus, 48000 (=(322+318)×3×25) samples per channel are encoded in one second.

As described before, each frame of the video signal is encoded in five blocks when the field frequency is 60 Hz or 59.94 Hz. In each block, the data DATAf is denoted by DATA with an odd number affix, the data DATAb is denoted by DATA with an even number affix, the parity Qf is denoted by Q with an odd number affix, and the parity Qb is denoted by Q with an even number affix. Hence, each block comprises the data DATA1 through DATA10 and the parities Q1 through Q10.

Figure 6A:
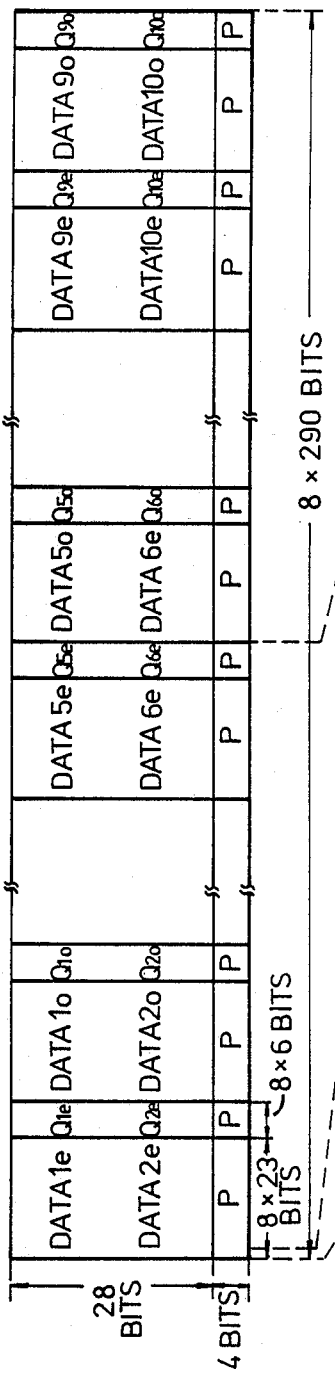
FIGS. 6A through 6C respectively are diagrams for explaining a signal format of an embodiment of a digital audio signal which is recorded and reproduced in the magnetic recording and reproducing system according to the present invention.

For the first block shown in FIG. 4, the encoder 26 sequentially obtains from a sample portion the samples in the even number columns 0, 2, ..., 22 and 30, 32, ..., 50, then sequentially obtains from a parity portion the samples in the even number columns 24, 26, 28, 52 and 56, thereafter sequentially obtains from a data portion the samples in the odd number columns 1, 3, ..., 21 and 29, 31, ..., 51, and finally sequentially obtains from a parity portion the samples in the odd number columns 23, 25, 27, 53, 55 and 57. Similarly, the encoder 26 sequentially obtains the samples for each of the second through fifth blocks. Accordingly, as shown in FIG. 6A, the samples of the data DATA1e, DATA2e, DATA1o, ..., DATA10e, DATA9o and DATA10o and the parities Q1e, Q2e, Q1o, ..., Q10e, Q9o and Q10o amounting to one frame of the video signal are sequentially obtained from each column shown in FIG. 4 from the leftmost column to the rightmost column. The data DATAie and DATA(i+1)e represent the data constituted by the samples obtained from the even number columns and the parities Qie and Q(i+1)e represent the parities constituted by the samples obtained from the even number columns, where i=1, 3, 5, ..., 9. Similarly, the data DATAio and DATA(i+1)o represent the daa constituted by the samples obtained from the odd number columns and the parities Qio and Q(i+1)o represent the parities constituted by the samples obtained from the odd number columns.

Figure 6B:
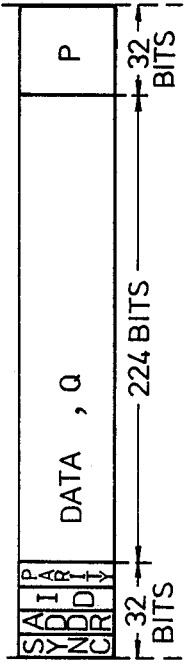
Figure 6C:
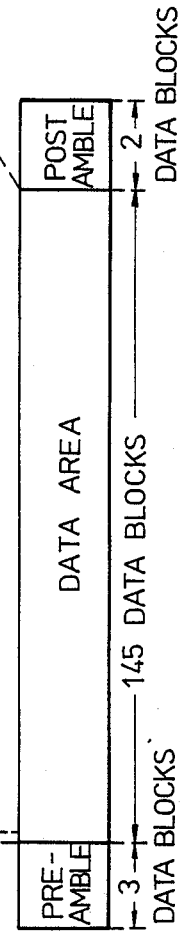

Each column comprises 28 symbols of the data and parity Q and 4 symbols of the parity P, that is, a total of 32 symbols or 256 bits. A data block is constituted by adding an 8-bit synchronizing signal SYNC, an 8-bit address signal ADDR, an 8-bit identification signal ID and an 8-bit block parity signal PARITY in front of each column as shown in FIG. 6B. The synchronizing signal SYNC indicates the start of each data block. Since data amounting to approximately one field is recorded in one track, the address signal ADDR indicates the order of each data block within the digital audio signal (that is, 145 data blocks) amounting to one track. For example, a least significant bit (LSB) of the identification signal ID is "0" in the case of the encoding of the block A and is "1" in the case of the encoding of the block B. The block parity signal PARITY is an error detection signal obtained by PARITY=ID⊕ADDR, where "⊕" denotes a modulo-2 addition. The data amounting to one field of the video signal, that is, the data DATA1e, DATA2e, DATA1o, ..., DATA4o, DATA5e and DATA6e, the parities Q1e, Q2e, Q1o, ..., Q4o, Q5e and Q6e and the corresponding parities P, are transmitted in 145 data blocks shown in FIG. 6C. But as shown in FIG. 6C, a preamble signal for reproducing the clock signal and amounting to three data blocks and a postamble signal amounting to two data blocks are respectively added before and after the 145 data blocks. Accordingly, in the case where the field frequency of the video signal is 60 Hz or 59.94 Hz, the transmission rate of the digital audio signal outputted from the encoder 26 is approximately 2.6 Mbits/sec.

In the case where the field frequency of the video signal is 50 Hz, a preamble signal amounting to three data blocks and a postamble signal amounting to two data blocks are respectively added before and after 174 data blocks. In this case, the transmission rate of the digital audio signal outputted from the encoder 26 is also approximately 2.6 Mbits/sec.

The digital audio signal from the encoder 26 is supplied to a 4-phase differential phase shift keying (DPSK) modulator 28. The 4-phase DPSK modulator 28 comprises a code converting circuit for subjecting the input digital data into a serial-to-parallel conversion and then subjecting the parallel data into a predetermined differential conversion, two balanced modulator circuits supplied with two parallel output signals of the code converting circuit via a lowpass filter for independently balance-modulating two carriers having a mutual phase difference of 90° by the two parallel output signals, and a circuit for adding output signals of the two balanced modulator circuits so as to obtain a digital audio signal which has been subjected to a 4-phase DPSK. For example, the carrier frequency is selected to 127 times the horizontal scanning frequency $f_H$, and in this case, the carrier frequency is approximately 2.00 MHz in the case of the NTSC system. In addition, the transmission rate of the digital audio signal is selected to approximately 2.6 Mbits/sec. For this reason, the output digital audio signal of the 4-phase DPSK modulator 28 has such a frequency spectrum that a maximum level occurs at the carrier frequency of 2.0 MHz, a zero level occurs at frequencies separated by $\pm 1.3$ MHz ($=2.6$ MHz/2) from the carrier frequency of 2.0 MHz, and a zero level similarly also occurs at frequencies 2.0 MHz$\pm n \times 1.3$ MHz, where n is a natural number. In other words, the output digital audio signal of the 4-phase DPSK modulator 28 has the known frequency spectrum which is shaped like the teeth of a comb.

The output digital audio signal of the 4-phase DPSK modulator 28 is passed through a bandpass filter 29 for eliminating an unwanted frequency component. The passband of the bandpass filter 29 has a center frequency of 2.0 MHz and has a width which is in the order of 0.7 times the transmission bit rate described before so as not to generate inter-symbol interference. Hence, the digital audio signal is band-limited in the bandpass filter 29 into a digital audio signal having a frequency spectrum shown in FIG. 2(B). The output digital audio signal of the bandpass filter 29 is passed through a recording amplifier 30 and is supplied to rotary audio heads 31a and 31b.

According to the 4-phase DPSK, one of four kinds of information is transmitted in one of four phases. Hence, the phase modulation needs to take place only once in two bits, and the speed with which the phase of the carrier is switched (symbol rate) can be reduced to one-half the transmission rate. In addition, it is possible to carry out the transmission in a frequency band amounting to the transmission rate, that is, sufficiently in a narrow frequency band in the order of 1.7 MHz because margin is taken.

The rotary video heads 15a and 15b are mounted on a rotary drum (not shown) at positions having an angular separation of 180° on a rotational plane of the rotary drum. Similarly, the rotary audio heads 31a and 31b are mounted on the rotary drum at positions having an angular separation of 180° on the rotational plane of the rotary drum, but the rotary audio heads 31a and 31b respectively lead the rotary video heads 15a and 15b by 120° along a rotating direction of the rotary drum.

The servo circuit 27 supplies the vertical synchronizing signal from the synchronizing signal separating circuit 14 to the encoder 26 so as to obtain field synchronization, and also supplies the vertical synchronizing signal to a driving circuit (not shown) for so that a drum motor (not shown) for rotating the rotary drum. Thus, the rotary drum is controlled so as to rotate in synchronism with the vertical synchronizing signal. Accordingly, when the field frequency is approximately 60 Hz, the rotary audio heads 31a and 31b alternately record the digital audio signal having the codes which are completed in each pair of tracks by saturation recording in a deep layer portion of a magnetic layer of a magnetic tape 33. On the other hand, when the field frequency is 50 Hz, the rotary audio heads 31a and 31b alternately record the digital audio signal having the codes which are completed in each track by saturation recording in the deep layer portion of the magnetic layer of the magnetic tape 33. Thereafter, the rotary video heads 15a and 15b alternately record the frequency division multiplexed signal (video signal) in a surface layer portion of the magnetic layer of the magnetic tape 33. The rotary video heads 15a and 15b of course have gaps with azimuth angles different from those of the rotary audio heads 31a and 31b. The servo circuit 27 also produces a control signal from the vertical synchronizing signal and supplies the control signal to a stationary head 32. The stationary head 32 records a control signal on and from a control track of the magnetic tape 33.

A sample number discriminating circuit 25 is supplied with the write-in and read-out addresses and a signal from the address generator 51 and the clock pulse fs. The sample number discriminating circuit 25 produces signals d1 and d2 which are supplied to the encoder 26. The signals d1 and d2 determine whether the codes are to be produced in the block A or the codes are to be produced in the block B.

Figure 7:
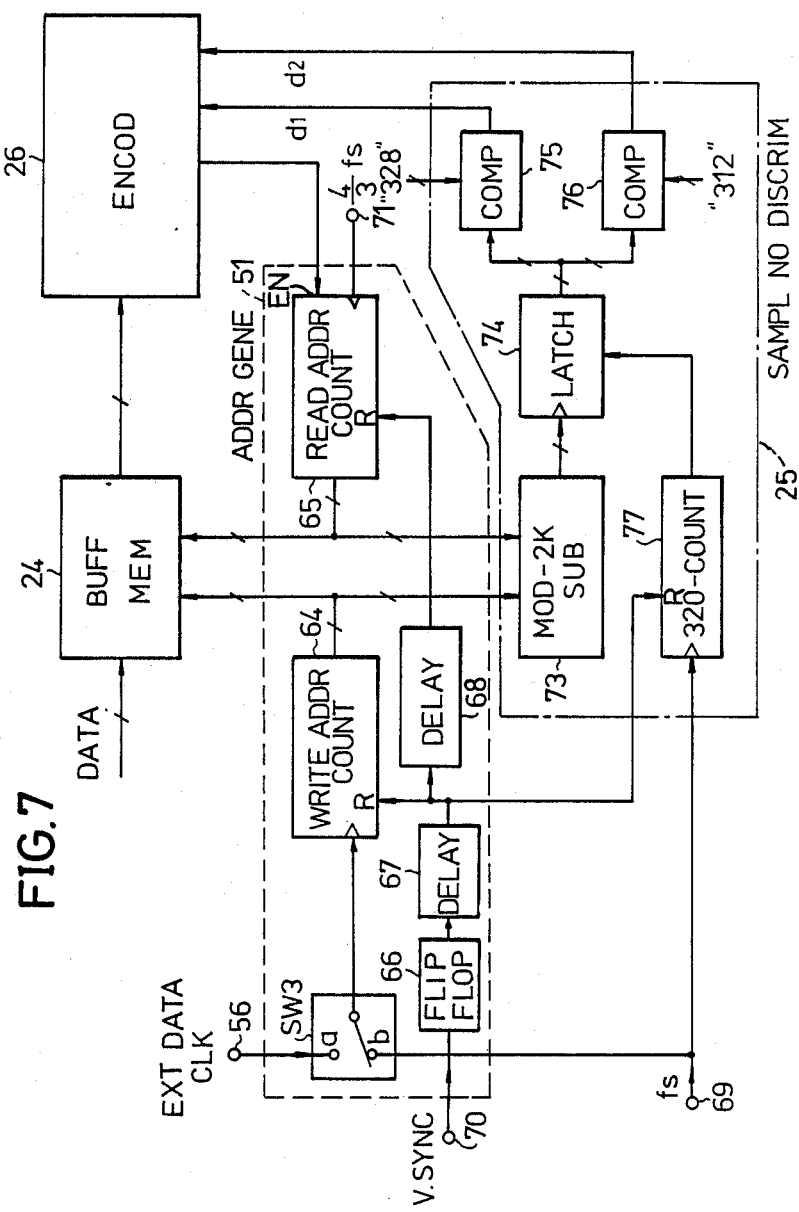
FIG. 7 is a block diagram showing an embodiment of an address generator and a sample number discriminating circuit within the block system shown in FIG. 1 together with a buffer memory and an encoder.

FIG. 7 shows an embodiment of the address generator 51 and the sample number discriminating circuit 25 together with the buffer memory 24 and the encoder 26. It is assumed that the buffer memory 24 has a memory capacity of $2k \times 8$ bits.

In FIG. 7, the address generator 51 comprises a switch SW3, a write-in address counter 64, a read-out address counter 65, a flip-flop circuit 66, and delay circuits 67 and 68. The external data clock from the terminal 56 is supplied to a contact a of the switch SW3, and the clock pulse fs from the clock generator 55 is supplied to a contact b of the switch SW3 via a terminal 69. The switch SW3 is linked to the switches SW1 and SW2 and is switched together with the switches SW1 and SW2. An output signal of the switch SW3 is supplied to a clock terminal of the write-in address counter 64. The vertical synchronizing signal from the servo circuit 27 is applied to a terminal 70 and is supplied to a reset terminal R of the write-in address counter 64 via the flip-flop circuit 66 and the delay circuit 67. As described before, the rotary audio heads 31a and 31b respectively lead the rotary video heads 15a and 15b by 120° along the rotating direction of the rotary drum, and the timing with which the recording of each digital audio signal track is started does not coincide with the timing of the vertical synchronizing signal. For this reason, the delay circuit 67 is provided for the purpose of matching the two timings. The timing signal (enable signal) from the encoder 26 is supplied to an enable terminal EN of the read-out address counter 65. The clock pulse 4fs/3 from the clock generator 55 is supplied to a clock terminal of the read-out address counter 65 via a terminal 71. The output signal of the delay circuit 67 is supplied to a reset terminal R of the read-out address counter 65 via the delay circuit 68. The write-in address from the write-in address counter 64 and the read-out address from the read-out address counter 65 are supplied to the buffer memory 24 and to the sample number discriminating circuit 25.

The sample number discriminating circuit 25 comprises a modulo-2k subtracting circuit 73, a latch circuit 74, comparators 75 and 76, and a 320-counter 77. The modulo-2k subtracting circuit 73 is supplied with the write-in and read-out addresses from the address generator 51. The clock pulse fs from the terminal 69 is supplied to a clock terminal of the 320-counter 77, and this 320-counter 77 is reset responsive to the output signal of the delay circuit 67 within the address generator 51. An output signal of the modulo-2k subtracting circuit 73 is latched by the latch circuit 74 responsive to an output latch signal of the 320-counter 77, and is supplied to the comparators 75 and 76. The output signals d1 and d2 of the comparators 75 and 76 are supplied to the encoder 26.

Figure 8:
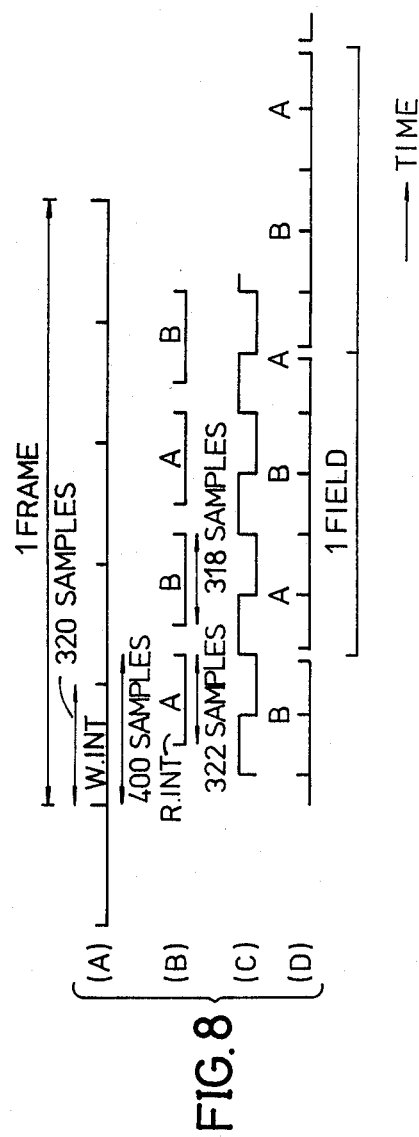
FIGS. 8(A) through 8(D) are timing charts for explaining the operation of the circuits shown in FIG. 7.

FIG. 8(A) shows one frame of the input video signal divided into five equal write-in intervals W.INT. Since it is assumed in the embodiment that the sampling frequency fs of the analog audio signal is 48 kHz and the input video signal has the field frequency of 60 Hz, input data amounting to 320 samples per channel are obtained in each write-in interval W.INT. In other words, the number of write-in data is 320 per channel in each write-in interval W.INT. FIGS. 8(B) shows read-out intervals R.INT. The read-out is started 1/10 frame after the start of the write-in, and data amounting to approximately 1/5 frame are read out in approximately 3/20 frame. Thus, data amounting to 400 samples are written into the buffer memory 24 at the time when the first write-in interval W.INT ends. Hence, the address difference between the read-out address and the write-in address is approximately 78 (=400−322) samples in the case of the block A and is approximately 82 (=400−318) samples in the case of the block B.

Accordingly, when the sampling frequency fs or the external data clock frequency is over 48 kHz, the address difference may become larger than 82 samples for the normal block sequence A, B, A, B, . . . , and in this case, the codes which are to be produced in the block A are encoded as they are as the block A but the codes which are to be produced in the block B are encoded as the block A. On the other hand, when the sampling frequency fs or the external data clock frequency is under 48 kHz, the address difference may become smaller than 78 samples, and in this case, the codes which are to be produced in the block B are encoded as they are as the block B but the codes which are to be produced in the block A are encoded as the block B.

Returning now to the description of FIG. 7, the buffer memory 24 has addresses "0" to "2047" (that is, 0 to 2k). The modulo-2k subtracting circuit 73 carries out a modulo-2k subtraction between the write-in address and the read-out address, and the output signal (address difference) of the modulo-2k subtracting circuit 73 is latched by the latch circuit 74 responsive to the output latch signal of the 320-counter 77 shown in FIG. 8(C). The modulo-2k subtraction refers to a subtraction such as those shown below.

$$0 - 2047 \rightarrow (0 + 2048) - 2047 = 1$$

$$100 - 1500 \rightarrow (100 + 2048) - 1500 = 648$$

The comparator 75 produces the signal d1 having a high level only when the latched address difference is greater than 328. On the other hand, the comparator 76 produces the signal d2 having a high level only when the latched address difference is less than 312. The encoder 26 can thus determine from the signals d1 and d2 whether the next block is to be encoded as the block A or the block B. In the case where both the signals d1 and d2 have low levels, the codes which are to be produced in the block A are encoded as they are as the block A and the codes which are to be produced in the block B are encoded as they are as the block B. The following Table 1 shows the relationships of the signals d1 and d2 and the encoding.

TABLE 1

| Signal d1 | Signal d2 | Encoding of Block |
|---|---|---|
| Low | Low | A → A, B → B |
| High | Low | A → A, B → A |
| Low | High | A → B, B → B |
| High | High | — |

FIG. 8(D) shows the intervals in which the blocks A and B are recorded on the magnetic tape 33.

Figure 9:
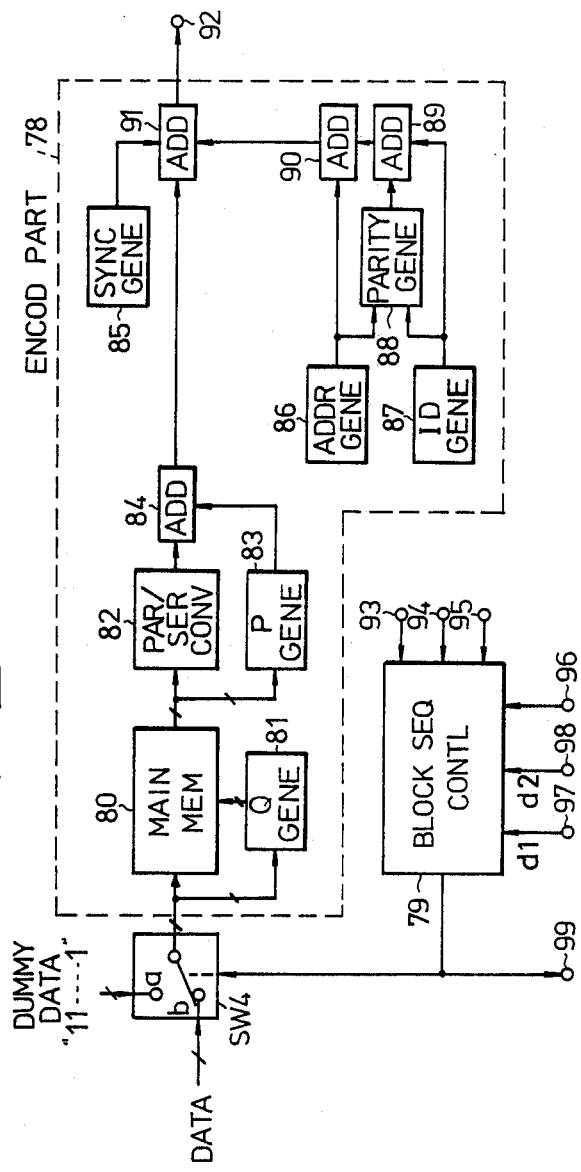
FIG. 9 is a system block diagram showing an embodiment of the encoder in the block system shown in FIG. 1.

FIG. 9 shows an embodiment of the encoder 26. The encoder 26 comprises a switch SW4, an encoding part 78 and a block sequence control circuit 79. The switch SW4 is supplied with the output datum of the buffer memory 21 to a contact b thereof and is supplied with a dummy datum "111 . . . 1" to a contact a thereof. An output datum of the switch SW4 is supplied to a main memory 80 and a parity Q generator 81 of the encoding part 78. The insertion of the dummy datum is known in R-DAT system and the like. The encoding part 78 comprises the main memory 80, the parity Q generator 81, a parallel-to-serial converter 82, a parity P generator 83, a synchronizing signal SYNC generator 85, an address signal ADDR generator 86, an identification signal ID generator 87, a parity PARITY generator 88, and adders 84, 89, 90 and 91. The construction and operation of the encoding part 78 are basically the same as those of a known R-DAT system, and detailed description thereof will be omitted. The encoded data to be supplied to the 4-phase DPSK modulator 28 shown in FIG. 1 are obtained via a terminal 92.

The clock pulses fs and 4fs/3 from the clock generator 55 are supplied to the block sequence control circuit 79 via respective terminals 93 and 94. The block sequence control circuit 79 is also supplied with the output vertical synchronizing signal of the servo circuit 27 via a terminal 95, the output detection signal of the color burst detecting circuit 16 via a terminal 96 and the output signals d1 and d2 of the sample number discriminating circuit 25 via terminals 97 and 98. The output timing signal of the block sequence control circuit 79 is supplied to the switch SW4 to control the connection thereof and is also supplied to the enable terminal EN of the read-out address counter 65 within the address generator 51 via a terminal 99.

Figure 10:
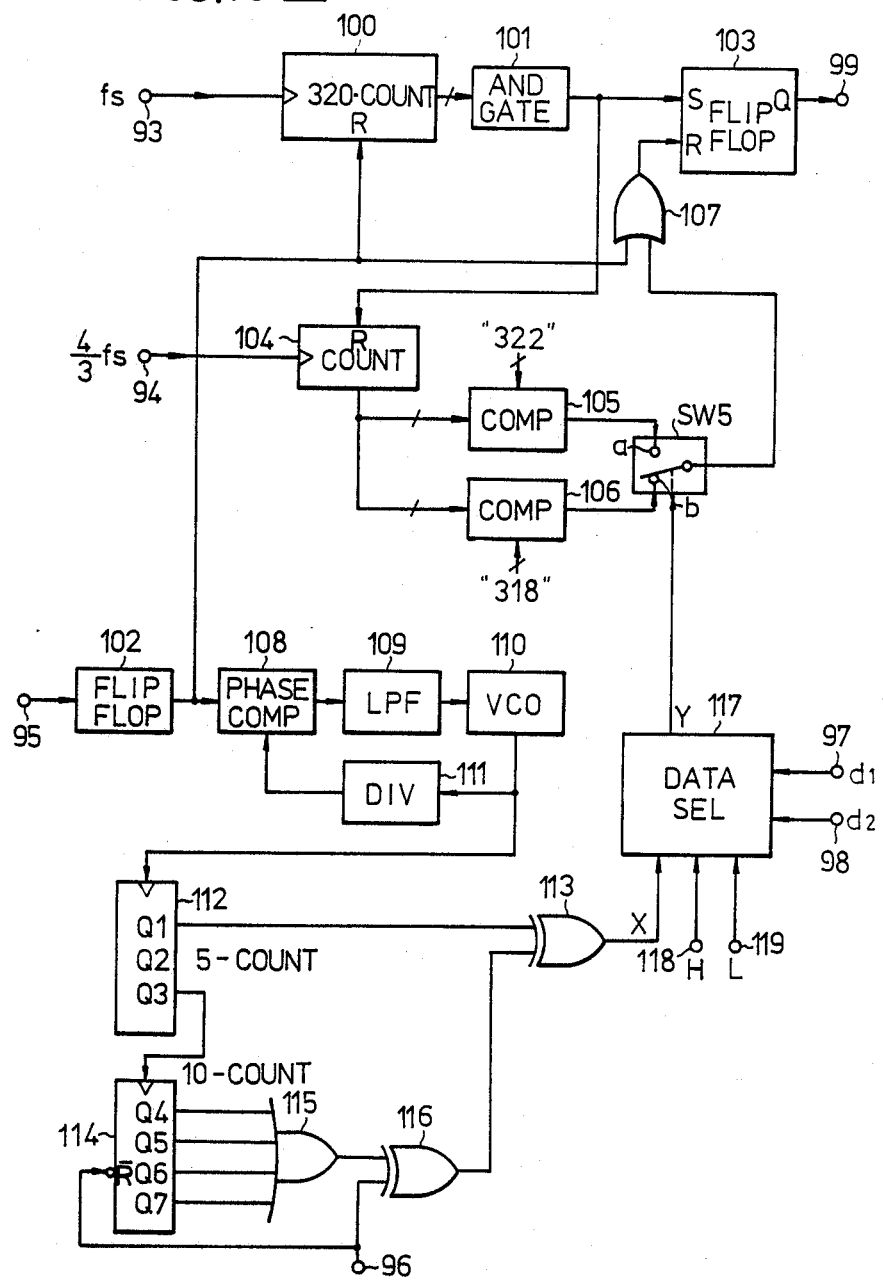
FIG. 10 is a system circuit diagram showing an embodiment of a block sequence control circuit within the block system shown in FIG. 9.

FIG. 10 shows an embodiment of the block sequence control circuit 79 for the case where the field frequency is approximately 60 Hz. The clock pulse fs from the terminal 93 is supplied to a clock terminal of a 320-counter 100, and an output signal of the 320-counter 100 is supplied to an AND circuit 101 which produces a pulse every time a counted value in the 320-counter 100 reaches "80". The 320-counter 100 is reset responsive to an output signal of a flip-flop 102 which is supplied with the output vertical synchronizing signal of the servo circuit 27 via the terminal 95. The output signal of the flip-flop 102 has a frame frequency $f_{FR}$ of the input video signal. The output pulse of the AND circuit 101 is supplied to a set terminal S of a flip-flop 103 and to a reset terminal R of a counter 104. The clock pulse 4fs/3 from the terminal 94 is supplied to a clock terminal of the counter 104.

An output signal of the counter 104 is supplied to comparators 105 and 106. The comparator 106 produces a pulse when a counted value in the counter 104 becomes equal to "318", and the comparator 105 produces a pulse when the counted value in the counter 104 becomes equal to "322". The output pulses of the comparators 105 and 106 are supplied to contacts a and b of a switch SW5, respectively. The switch SW5 is connected to the contact a during the low-level period of a signal Y which will be described later, and is connected to the contact b during a high-level period of the signal Y. An output signal of the switch SW5 is supplied to an OR circuit 107 which is also supplied with the output signal of the flip-flop 102, and an output signal of the OR circuit 107 is supplied to a reset terminal R of the flip-flop 103.

The output signal of the flip-flop 102 is passed through a phase comparator 108, a lowpass filter 109 and a voltage controlled oscillator (VCO) 110. An output signal of the VCO 110 having a frequency of $5f_{FR}$ is frequency-divided by 1/5 in a frequency divider 111, and an output signal of the frequency divider 111 is fed back to the phase comparator 108.

The output signal of the VCO 110 shown in FIG. 11(A) is also supplied to a clock terminal of a 5-counter 112. An output Q1 of the first stage of the 5-counter 112 is supplied to an exclusive-OR circuit 113. An output Q3 of the third stage of the 5-counter 112 is supplied to a clock terminal of a 10-counter 114. Outputs Q4 through Q7 of the first through fourth stages of the 10-counter 114 are supplied to an exclusive-OR circuit 116 through an OR circuit 115. The exclusive-OR circuit 116 is also supplied with the output detection signal of the color burst detecting circuit 16 obtained via the terminal 96. The output detection signal is also supplied to a reset terminal $\overline{R}$ of the 10-counter 114, and resets the second through fourth stages of the 10-counter 114 except for the first stage of the same, when the output detection signal is low level.

The output of the exclusive-OR circuit 116 is supplied to the exclusive-OR circuit 113 which supplies an output signal X thereof to a data input terminal of a data selector 117. Other two data input terminals 118 and 119 of the data selector 117 are fixed at high level and low level, respectively. The data selector 117 is also supplied with the signals d1 and d2 from the respective terminals 97 and 98 as control inputs, and produces the output signal Y mentioned before according to the function table shown in Table 2.

TABLE 2

| Signals | | Output signal Y |
|---|---|---|
| d1 | d2 | |
| Low | Low | Signal X |
| High | Low | Fixed Low |
| Low | High | Fixed High |
| High | High | — |

FIGS. 11(B) through 11(E) show the outputs Q1 through Q3 of the 5-counter 112 and the output Q4 of the 10-counter 113, respectively. When the output detection signal of the color burst detecting circuit 16 is low level, that is, when the input video signal is a monochrome video signal having a field frequency of 60 Hz, the second through fourth stages of the 10-counter 114 are reset and the outputs Q5 through Q7 assume low level. Hence, the outputs of the OR circuit 115 and the exclusive-OR circuit 116 are the same as the output Q4 of the 10-counter 114 shown in FIG. 11(E). In this case, the output signal X of the exclusive-OR circuit 113 shown in FIG. 11(F) is obtained, and is supplied to the switch SW5 through the data selector 117 to cause the switch SW5 to pass a reset signal for the flip-flop 103 when the counted value of the counter 104 reaches "322" or "318" dependent on whether the level of the output signal Y of the data selector 117 (which is identical to the output signal X of the exclusive-OR circuit 113 as far as the sampling frequency fs or the external data clock frequency and the field frequency of the input video signal are exactly kept at their nominal frequencies) is low or high.

Therefore, depending on whether the level of the output signal X of the exclusive-OR circuit 103 is low or high, the read-out address counter 65 controlled by the Q-output signal of the flip-flop 103 reads out 322 samples or 318 samples during each read-out interval R.INT, and makes the samples block A or B. The sequence of the blocks A and B written in FIG. 11(F) dependent on the level of the signal X shows the blocks A, B, A, B and A (that is, the E-block frame) in the first video frame interval and the blocks B, A, B, A and B (that is, the D-block frame) in the second video frame interval, and this sequence is identical to the predetermined sequence shown in FIG. 5A.

In the case the input video signal is an NTSC system color video signal, the output detection signal of the color burst detecting circuit 16 assumes high level, and the outputs Q4 through Q7 of the 10-counter 114 shown in FIGS. 12(A) through 12(D) are obtained. FIGS. 12(E) and 12(F) show the outputs of the OR circuit 115 and the exclusive-OR circuit 116, respectively, where FIGS., 12(A) through 12(F) are drawn on a time base different from that of FIGS. 11(A) through 11(F). FIGS. 13(A) through 13(C) are drawn on a time base identical to that of FIGS. 11(A) through 11(F), and show the output Q1 of the 5-counter 112 and the outputs of the exclusive-OR circuits 116 and 113, respectively. The output signal X of the exclusive-OR circuit 113 is supplied to the switch SW5 through the data selector 117 to cause the switch SW5 and the flip-flop 103 to produce a block sequence control signal.

The sequence written in FIG. 13(C) shows the block B, A, B, A and B in the first frame (that is, the D-block frame) in the first video frame interval and the blocks A, B, A, B and A (that is, the E-block frames) in the second through tenth video frame intervals, and this sequence is identical to the predetermined sequence shown in FIG. 5(C).

The Q-output of the flip-flop 103 is obtained from the terminal 99 as the timing signal (or the enable signal) and is supplied to the switch SW4 shown in FIG. 9 and to the enable terminal EN of the read-out address counter 65 shown in FIG. 7. The output signal Y of the data selector 117 corresponds to the LSB of the identification signal ID.

The block sequence control circuit 79 shown in FIG. 10 can also be used for the case where the field frequency is 50 Hz. In this case, the dividing ratio of the frequency divider 111 is set to 1/6 and the terminal 96 for the color burst detection signal is fixed at low level. Alternatively, when modifying the block sequence control circuit 79 for exclusive use in the field frequency of 50 Hz, the counters 112 and 114 and the OR circuits 113, 115 and 116 may be omitted and replaced by a flip-flop, in addition to setting the dividing ratio of the frequency divider 111 to 1/6.

In a reproducing mode, the digital audio signals alternately reproduced by the rotary audio heads 31a and 31b from the deep layer portion of the magnetic layer of the magnetic tape 33 is supplied to a pre-amplifier 40. The frequency division multiplexed signal (video signal) alternately reproduced by the rotary video heads 15a and 15b from the surface layer portion of the magnetic layer of the magnetic tape 33 is supplied to a switching amplifier 35. In addition, the control signal reproduced by the stationary head 32 from the control track of the magnetic tape 33 is supplied to the servo circuit 27. The servo circuit 27 controls the rotation of the rotary drum via the driving circuit and the drum motor, so that the reproduced control signal becomes synchronized to a reference frequency signal.

The switching amplifier 35 amplifies the reproduced frequency division multiplexed signals from the rotary video heads 15a and 15b and also carries out a switching so as to obtain a continuous reproduced frequency division multiplexed signal. The continuous reproduced frequency division multiplexed signal from the switching amplifier 35 is supplied to a video signal processing circuit 37 via a pre-amplifier 36. The video signal processing circuit 37 separates the continuous reproduced frequency division multiplexed signal into the FM luminance signal and the frequency converted carrier chrominance signal, frequency-demodulates the FM luminance signal, frequency-converts the frequency converted carrier chrominance signal back into the original frequency band, and produces a reproduced color video signal which is in conformance with the standard color system and comprises the luminance signal and the carrier chrominance signal. The video signal processing circuit 37 itself is known, and the reproduced color video signal from the video signal processing circuit 37 is outputted via an output terminal 38.

The pre-amplifier 40 amplifies the reproduced digital audio signals from the rotary audio heads 31a and 31b and also carries out a switching so as to obtain a continuous reproduced digital audio signal. This continuous reproduced digital audio signal is supplied to a bandpass filter 41 wherein a reproduced digital audio signal having the frequency spectrum shown in FIG. 2(B) is separated, and this separated reproduced digital audio signal is supplied to a 4-phase DPSK demodulator 42. The 4-phase DPSK demodulator 42 carries out a 4-phase DPSK demodulation of the reproduced digital audio signal from the bandpass filter 41 and supplies a demodulated digital audio signal to a decoder 43.

The decoder 43 is also supplied with a vertical synchronizing signal from the servo circuit 27 which produces this vertical synchronizing signal in synchronism with the reproduced control signal. The decoder 43 carries out processings such as de-interleaving, error correction, jitter compensation and time base expansion.

The decoder 43 detects the value of the LSB of the identification signal ID and regards each symbol datum arranged in the column numbers 48 to 51 of the row numbers 24 to 27 shown in FIG. 3 as samples only when the value of the LSB is "0". The decoder 43 independently outputs the samples of the right channel and the samples of the left channel. The samples of the right channel and the samples of the left channel, that is, the digitized right channel audio signal and the digitized left channel audio signal, are respectively supplied to digital-to-analog (D/A) converters 47a and 47b and are converted into right and left channel analog audio signals. The right and left channel analog audio signals from the D/A converters 47a and 47b are respectively passed through deglitcher circuits 48a and 48b for eliminating a noise component which is generated during the digital-to-analog conversion. Output signals of the deglitcher circuits 48a and 48b are respectively passed through lowpass filters 49a and 49b for eliminating an unwanted high frequency component exceeding the audio frequency band, and reproduced right and left channel analog audio signals are outputted via output terminals 50a and 50b.

Therefore, the sequence in which the blocks A and B are generated is determined by the field frequency of the video signal, and for this reason, it is possible to obtain synchronism between the video signal and the digital audio signal regardless of whether the field frequency is 50 Hz, 59.94 Hz or 60 Hz. It is unnecessary to change the sampling frequency of the analog audio signal nor greatly modify the encoding algorithm.

The construction and operation of the decoder 43 will be easily understood to those skilled in the art from the description given before on the encoder 26, and detailed description thereof will be omitted. In the reproducing mode, the digital-to-analog conversion in the D/A converters 47a and 47b are carried out responsive to the clock pulse fs. But when the sampling frequency of the recorded audio information is over 48 kHz, the data in a main memory of the decoder 43 successively increases. When the data in the main memory of the decoder 43 exceeds a certain quantity, a signal indicative of a difference between the write-in address and the read-out address is obtained as in the case of the modulo-2k subtraction carried out in the address generator 51 shown in FIG. 7, and this signal is supplied to a capstan servo circuit (not shown) in the servo circuit 27 so that the rotational speed of a capstan (not shown) for transporting the magnetic tape 33 is slowed down by a quantity dependent on the signal thereby slowing down the tape transport speed. A complementary operation is carried out when the sampling frequency of the recorded audio information is under 48 kHz. In other words, the tape transport speed is slightly varied depending on the address difference of the main memory within the decoder 43.

In addition, since the audio signal within one frame of the video signal is divided into five or six blocks and the codes are completed within each block, the delay time of the digital audio signal introduced with respect to the video signal during the decoding is small, and the timings of the reproduced video and audio information substantially coincide. Hence, the present invention is especially effective when carrying out the digital dub-recording involving decoding and encoding. Furthermore, because the sample portion and the parity portion of the block shown in FIG. 3 are obtained independently in even number columns and odd number columns and recorded on the magnetic tape 33, the samples in the even number columns and the samples in the odd number columns are recorded at mutually separated positions on the magnetic tape 33 thereby improving the interpolation capability when a burst error occurs.

In the digital dub-recording mode, the block A and the block B are generated depending on the discrimination signal from the sample number discrimination circuit 25. Thus, even when the sampling frequency of the analog audio signals applied to the input terminals 34a and 34b slightly deviates from 48 kHz, this deviation can be absorbed by the blocks A and B so as to enable the digital dub-recording. In this case, the deviation of the sampling frequency can be absorbed for both cases where the sampling frequency increases and decreases, because the block A comprises 322 samples per channel, the block B comprises 318 samples per channel, the number of samples in the block A is greater than 320 samples within 1/5 frame of the video signal having the field frequency of 60 Hz, and the number of samples in the block B is less than the 320 samples within 1/5 frame of the video signal having the field frequency of 60 Hz. There is also an advantage in that the blocks A and B can be identified and discriminated from each other by use of one bit.

For convenience' sake, detailed description for the case where the field frequency is 50 Hz will be omitted since it would be evident to those skilled in the art.

As previously proposed by the present assignee in a U.S. patent application Ser. No. 018,153 entitled "Magnetic Recording And Reproducing System" filed Feb. 24, 1987, it is possible to provide an odd/even sample separating circuit and a delay circuit between the buffer memory 24 and the A/D converters 23a and 23b. In this case, when consecutive numbers are assigned to the samples constituting the right and left channel digital signals in the sampled sequence within one frame of the video signal, the odd/even sample separating circuit separates the samples into odd numbered samples OS and even numbered samples ES. Either the odd numbered samples OS or the even numbered samples ES are delayed by a predetermined time (for example, 1/5 the time period of one frame) in the delay circuit. The encoding according to the present invention may be carried out by then adding a fade control signal to the identification signal ID. In this case, a cross fade control circuit, a delay circuit and a cross fader are provided between the decoder 43 and the D/A converters 47a and 47b so as to match the timings of the odd numbered samples OS and the even numbered samples ES and carry out the cross fading responsive to the fade control signal. By making such a modification, it becomes possible to make the audio signal approximately continuous at a joint of a previous recording and a new recording when an assembly editing or an insert recording is carried out so as to minimize a click noise generated at the joint.

Instead of recording the digital audio signal in the deep layer portion of the magnetic tape 33 by the rotary audio heads 31a and 31b, it is possible to increase the angular range for which the magnetic tape 33 is wrapped obliquely around the peripheral surface of the rotary drum and time-divisionally record the digital audio signal and the frequency division multiplexed signal (video signal) by the rotary video heads 15a and 15b. Further, the digital audio signal and the frequency division multiplexed signal (video signal) may be recorded on mutually different tracks of the magnetic tape 33. In these cases where the digital audio signal and the frequency division multiplexed signal (video signal) are recorded time-divisionally, no control track is formed on the magnetic tape 33, and for example, a tracking control is carried out by use of four kinds of pilot signals which have mutually different frequencies and are successively recorded on the oblique tracks of the magnetic tape 33.

In the embodiment described heretofore, the system employs the 4-phase DPSK, but the system may employ other modulation systems such as the 4-phase phase shift keying (PSK) and the offset 4-phase DPSK. It is possible to transmit the information in a narrow frequency band as in the case of the 4-phase DPSK when the 4-phase PSK or the offset 4-phase DPSK is employed. The 4-phase PSK and the offset 4-phase DPSK both transmit the information in four phases, as in the case of the 4-phase DPSK. According to the 4-phase DPSK, there is no fixed reference phase for determining the correspondence of the carrier phase and the codes and the correspondence of the carrier phase and the codes is determined by the change in the phase with reference to the immediately preceding carrier phase. On the other hand, according to the 4-phase PSK, the correspondence of the carrier phase and the codes is determined by a fixed reference phase. According to the offset DPSK, the two modulated signals obtained by the 4-phase DPSK are shifted by ½ the time slot so that there is no phase jump of 180°, and the constant amplitude stability is improved.

Further, the present invention is not limited to these embodiments, but various variations and modifications may be made without departing from the scope of the present invention.

What is claimed is:

1. A magnetic recording and reproducing system comprising:
a first video signal processing means for subjecting an input video signal in conformance with a standard television system to a predetermined signal processing and for producing a video information signal having a predetermined signal format suited for magnetic tape recording and reproduction;
first recording and reproducing means for recording and reproducing the video information signal on and from tracks formed obliquely to a longitudinal direction of a magnetic tape;
second video signal processing means for subjecting the video information signal reproduced by said first recording and reproducing means to a predetermined signal processing and for producing a reproduced video signal in conformance with said standard television system;
analog-to-digital converting means for sampling an input analog audio signal at a predetermined sampling frequency and for producing a digitized audio signal;
encoding means for encoding said digitized audio signal from said analog-to-digital converting means into an encoded digital audio signal comprising first and second blocks which occur in a predetermined sequence dependent on a field frequency of the input video signal and an identification signal for identifying said first and second blocks, said first block being made up of a first number of samples constituting said digitized audio signal from said analog-to-digital converting means, said second block being made up of a second number of the samples constituting said digitized audio signal from said analog-to-digital converting means, said first number of samples being greater than a number of samples in 1/N frame of said input video signal and said second number of samples being less than said number of samples in 1/N frame of said input video signal, where N is an integral multiple of five when the field frequency of said input video signal is approximately 60 Hz and is an integral multiple of six when the field frequency of said input video signal is approximately 50 Hz, said encoding means successively encoding all of the samples constituting said digitized audio signal from said analog-to-digital converting means in each frame so that codes are completed in each of said first and second blocks;

second recording and reproducing means for recording and reproducing the encoded digital audio signal on and from the tracks of the magnetic tape, each of said tracks being recorded with the video information signal and the encoded digital audio signal respectively amounting to one field of said input video signal;

decoding means for decoding the encoded digital audio signal reproduced by said second recording and reproducing means in blocks with reference to the identification signal so as to produce all of the samples of each frame; and audio signal processing means comprising means for producing a reproduced digitized audio signal from the samples obtained from said decoding means and means for producing a reproduced analog audio signal by subjecting the reproduced digitized audio signal to a digital-to-analog conversion.

2. A magnetic recording and reproducing system as claimed in claim 1 in which said input video signal has a field frequency of 60 Hz, said predetermined sequence having a period of two frames, in each period of said predetermined sequence a first frame comprising five blocks made up of an alternate repetition of said first and second blocks and a second frame comprising five blocks made up of an alternate repetition of said second and first blocks.

3. A magnetic recording and reproducing system as claimed in claim 1 in which said input video signal has a field frequency of 59.94 Hz, said predetermined sequence having a period of ten frames, in each period of said predetermined sequence a first frame comprising five blocks made up of an alternate repetition of said second and first blocks and second through tenth frames each comprising five blocks made up of an alternate repetition of said first and second blocks.

4. A magnetic recording and reproducing system as claimed in claim 1 in which said input video signal has a field frequency of 50 Hz, said predetermined sequence having a period of one frame, each period of said predetermined sequence comprising six blocks made up of an alternate repetition of said first and second blocks.

5. A magnetic recording and reproducing system as claimed in claim 1 in which said video information signal and said encoded digital audio signal are recorded in mutually different layer portions of a magnetic layer of the magnetic tape.

6. A magnetic recording and reproducing system as claimed in claim 1 in which said video information signal and said encoded digital audio signal are recorded time-divisionally in different portions of each track of the magnetic tape.

7. A magnetic recording and reproducing system comprising:

a first video signal processing means for subjecting an input video signal in conformance with a standard television system to a predetermined signal processing and for producing a video information signal having a predetermined signal format suited for magnetic tape recording and reproduction;

first recording and reproducing means for recording and reproducing the video information signal on and from tracks formed obliquely to a longitudinal direction of a magnetic tape;

second video signal processing means for subjecting the video information signal reproduced by said first recording and reproducing means to a predetermined signal processing and for producing a reproduced video signal in conformance with said standard television system;

analog-to-digital converting means for sampling an input analog audio signal at a predetermined sampling frequency and for producing a digitized audio signal;

encoding means for encoding said digitized audio signal from said analog-to-digital converting means into an encoded digital audio signal comprising first and second blocks which occur in a predetermined sequence dependent on a field frequency of the input video signal and an identification signal for identifying said first and second blocks, said first block being made up of a first number of samples constituting said digitized audio signal from said analog-to-digital converting means, said second block being made up of a second number of the samples constituting said digitized audio signal from said analog-to-digital converting means, said first number of samples being greater than a number of samples in 1/N field of said input video signal and said second number of samples being less than said number of samples in 1/N field of said input video signal, where N is an integral multiple of five when the field frequency of said input video signal is approximately 60 Hz and is an integral multiple of six when the field frequency of said input video signal is approximately 50 Hz, said encoding means successively encoding all of the samples constituting said digitized audio signal from said analog-to-digital converting means in each field so that codes are completed in each of said first and second blocks;

second recording and reproducing means for recording and reproducing the encoded digital audio signal on and from the tracks of the magnetic tape, each of said tracks being recorded with the video information signal and the encoded digital audio signal respectively amounting to one field of said input video signal;

decoding means for decoding the encoded digital audio signal reproduced by said second recording and reproducing means in blocks with reference to the identification signal so as to produce all of the samples of each field; and audio signal processing means comprising means for producing a reproduced digitized audio signal from the samples obtained from said decoding means and means for producing a reproduced analog audio signal by subjecting the reproduced digitized audio signal to a digital-to-analog conversion.

8. A magnetic recording and reproducing system as claimed in claim 7 in which said input video signal has a field frequency of 60 Hz, said predetermined sequence having a period of two fields, in each period of said predetermined sequence a first field comprising five blocks made up of an alternate repetition of said first and second blocks and a second field comprising five blocks made up of an alternate repetition of said second and first blocks.

9. A magnetic recording and reproducing system as claimed in claim 7 in which said input video signal has a field frequency of 59.94 Hz, said predetermined sequence having a period of ten fields, in each period of said predetermined sequence a first field comprising five blocks made up of an alternate repetition of said second and first blocks and second through tenth fields each comprising five blocks made up of an alternate repetition of said first and second blocks.

10. A magnetic recording and reproducing system as claimed in claim 7 in which said input video signal has a field frequency of 50 Hz, said predetermined sequence having a period of one field, each period of said predetermined sequence comprising six blocks made up of an alternate repetition of said first and second blocks.

11. A magnetic recording and reproducing system as claimed in claim 7 in which said video information signal and said encoded digital audio signal are recorded in mutually different layer portions of a magnetic layer of the magnetic tape.

12. A magnetic recording and reproducing system as claimed in claim 7 in which said video information signal and said encoded digital audio signal are recorded time-divisionally in different portions of each track of the magnetic tape.

13. A magnetic recording system comprising:
video signal processing means for subjecting an input video signal in conformance with a standard television system to a predetermined signal processing and for producing a video information signal having a predetermined signal format suited for magnetic tape recording;
first recording means for recording the video information signal on tracks to be formed obliquely to a longitudinal direction of a magnetic tape;
analog-to-digital converting means for sampling an input analog audio signal at a predetermined sampling frequency and for producing a digitized audio signal;
encoding means for encoding said digitized audio signal from said analog-to-digital converting means into an encoded digital audio signal comprising first and second blocks which occur in a predetermined sequence dependent on a field frequency of the input video signal and an identification signal for identifying said first and second blocks, said first block being made up of a first number of samples constituting said digitized audio signal from said analog-to-digital converting means, said second block being made up of a second number of the samples constituting said digitized audio signal from said analog-to-digital converting means, said first number of samples being greater than a number of samples in 1/N frame of said input video signal and said second number of samples being less than said number of samples in 1/N frame of said input video signal, where N is an integral multiple of five when the field frequency of said input video signal is approximately 60 Hz and is an integral multiple of six when the field frequency of said input video signal is approximately 50 Hz, said encoding means successively encoding all of the samples constituting said digitized audio signal from said analog-to-digital converting means in each frame so that codes are completed in each of said first and second blocks; and
second recording means for recording the encoded digital audio signal on the tracks of the magnetic tape, each of said tracks being recorded with the video information signal and the encoded digital audio signal respectively amounting to one field of said input video signal.

14. A magnetic recording system comprising:
video signal processing means for subjecting an input video signal in conformance with a standard television system to a predetermined signal processing and for producing a video information signal having a predetermined signal format suited for magnetic tape recording;
first recording means for recording the video information signal on tracks to be formed obliquely to a longitudinal direction of a magnetic tape;
analog-to-digital converting means for sampling an input analog audio signal at a predetermined sampling frequency and for producing a digitized audio signal;
encoding means for encoding said digitized audio signal from said analog-to-digital converting means into an encoded digital audio signal comprising first and second blocks which occur in a predetermined sequence dependent on a field frequency of the input video signal and an identification signal for identifying said first and second blocks, said first block being made up of a first number of samples constituting said digitized audio signal from said analog-to-digital converting means, said second block being made up of a second number of the samples constituting said digitized audio signal from said analog-to-digital converting means, said first number of samples being greater than a number of samples in 1/N field of said input video signal and said second number of samples being less than said number of samples in 1/N field of said input video signal, where N is an integral multiple of five when the field frequency of said input video signal is approximately 60 Hz and is an integral multiple of six when the field frequency of said input video signal is approximately 50 Hz, said encoding means successively encoding all of the samples constituting said digitized audio signal from said analog-to-digital converting means in each field so that codes are completed in each of said first and second blocks; and
second recording means for recording the encoded digital audio signal on the tracks of the magnetic tape, each of said tracks being recorded with the video information signal and the encoded digital audio signal respectively amounting to one field of said input video signal.

* * * * *